March 15, 1949. G. W. BREUER 2,464,552
COMBINED BLOWER AND SUCTION DEVICE
Filed May 2, 1946
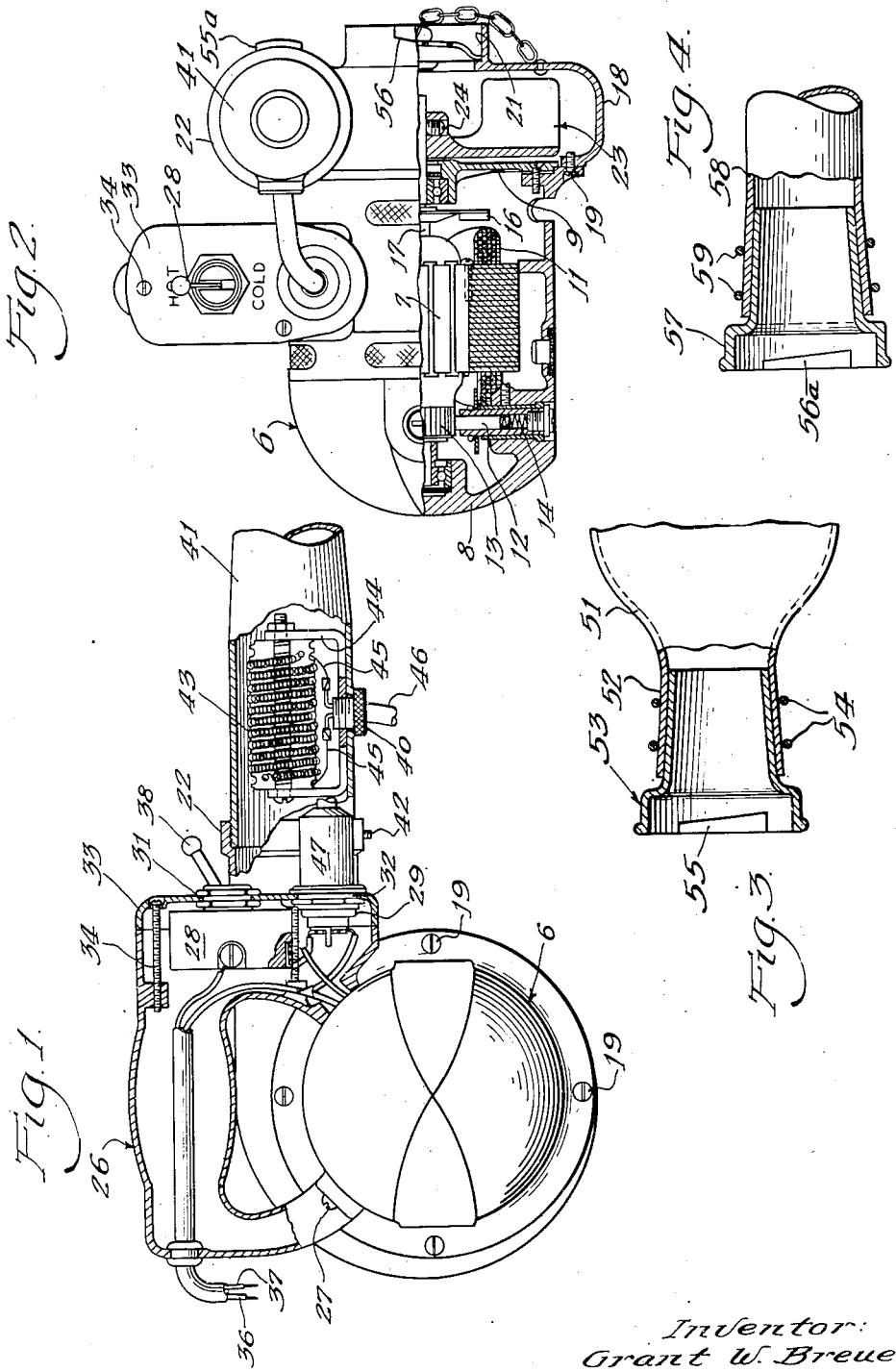
Inventor:
Grant W. Breuer
By: Lee J. Gary
Attorney Patented Mar. 15, 1949

2,464,552

UNITED STATES PATENT OFFICE 2,464,552

COMBINED BLOWER AND SUCTION DEVICE

Grant W. Breuer, Northbrook, Ill., assignor to Breuer Electric Mfg. Company, Chicago, Ill., a corporation of Illinois Application May 2, 1946, Serial No. 666,770

7 Claims. (Cl. 219—39)

1

This invention relates to improvements in a combined blower and suction device adapted for use as a vacuum cleaner, or for use as a blower for discharging a stream of heated or unheated air, and has for an object the provision of a compact, lightweight device of this type which is relatively simple and inexpensive in operation and construction and which will not readily get out of order.

This invention further contemplates the provision of a device of this type embodying improved means to facilitate the conversion of the device for use as either a blower or vacuum cleaner.

This invention further contemplates the provision of a portable type of combined blower and suction device provided with a lifting handle formed to enclose an operating switch, and to also enclose an electrical outlet socket disposed adjacent the blower outlet to receive an electrical plug connector leading from an electrical heating unit disposed within an air nozzle which is detachably connected to the blower outlet.

This invention embodies other novel features, details of construction and arrangement of parts which are hereinafter set forth in the specification and claims and illustrated in the accompanying drawing wherein:

Fig. 1 is a side elevational view, partly in section, showing a combined blower and suction device embodying features of this invention, the device being illustrated with the blower nozzle mounted thereon.

Fig. 2 is a front elevational view, partly in section, showing the device.

Fig. 3 is a fragmentary detail view, partly in side elevation and partly in section, showing the manner of mounting a dirt receptacle upon the outlet end of the blower.

Fig. 4 is a detail view, partly in section and partly in side elevation, showing an adapter employed for detachable engagement with the inlet end of the blower, said adapter having a suction hose secured thereto.

Referring now to the drawing for a better understanding of this invention, the combined blower and suction device is shown as comprising an electric motor 6 having an armature 7 journaled at its one end in a motor housing 8 and its other end in a cover plate 9. The motor housing 8 also encloses a field 11 and brushes 12 which

2 are held against the commutator 13 by means of springs 14. A motor cooling fan 16 is secured to the armature shaft 17 for circulating air within the motor housing 8 to cool the motor.

A fan casing 18 is secured to the motor housing 8 by means of screws 19, and is provided with an axially disposed flanged air inlet opening 21 and a tangentially disposed air outlet opening 22. The fan casing 18 encloses a fan 23 which is secured to the motor shaft 17 by means of a set screw 24.

A handle 26 is secured to the motor casing 8 by means of screws 27 and is in the form of a hollow shell to receive a switch 28 and an electrical socket outlet 29. The switch 28 and socket outlet 29 are secured in apertures 31 and 32, respectively, provided in a handle cover plate 33. The handle cover plate is secured to the handle 26 by means of screws 34. The motor 6 and socket outlet 29 are connected to a source of current by means of leads 36 and 37, the switch 28 being interposed in one of said leads for controlling the flow of current therethrough. The switch 28 is provided with an operating handle 38 which is disposed for convenient operation by the user.

In the use of the apparatus thus shown and described for blowing streams of heated air or unheated air, an air nozzle 41 is threaded into the internally threaded outlet 22 of the fan casing 18 and held against accidental displacement therefrom by means of a set screw 42. An electrical heating unit 43 is supported within the nozzle 41 upon a bracket 44 which is secured in position by means of a threaded grommet 40 which also serves to receive a pair of leads 45—45 extending outwardly from the heating unit. The leads are preferably enclosed within a suitable insulating jacket 46. A plug connector 47 is connected to the outer ends of the leads 45—45 for electrical engagement with the socket outlet 29 provided on the handle cover plate 33. By closing the circuit through the leads 36 and 37 to the motor 6 and heating unit 43 by means of the 3-way toggle switch 28, a stream of heated air is forced outwardly through the nozzle 41 by the fan 23. A stream of unheated air may be directed through the nozzle 41 by merely moving the toggle switch handle 38 to a second position to operate the motor 6 and to break the circuit to the heating unit 43. The switch handle 38 is movable to an off position to break the circuit to the motor and heating unit when the device is not in use.

The apparatus shown and described may readily be adapted for use as a vacuum cleaner by merely removing the nozzle 41 from the outlet 22 of the fan casing 18 and replacing same with a dirt receptacle 51 in the form of a cloth bag having a neck portion 52 secured to an adapter 53 by means of clamps 54. The adapter is provided with a pair of internal diametrically opposed locking lugs 55 for detachable engagement with diametrically opposed lugs 55a provided on the outlet 22 of the fan casing, the adapter being locked in position or unlocked for removal by merely turning same approximately one-half revolution. The air inlet opening 21 of the fan casing is also provided with a pair of diametrically opposed locking lugs 56 for detachable interlocking engagement with a pair of diametrically opposed locking lugs 56a provided on a second adapter 57. The locking lugs 56 and 56a are also positioned in locking engagement or unlocking position by merely turning the adapter 57 through about one-half revolution. One end of a flexible hose 58 is secured to the adapter 57 by means of clamps 59, and the other end of the hose is provided with any suitable type of vacuum cleaner nozzle.

In the use of this device as a vacuum cleaner, air and dirt are drawn inwardly through the flexible hose 58, through the fan casing 18 and then into the dirt container 51 by means of the fan 23. It will thus be seen that the apparatus may readily be converted for use as blower for directing either heated or unheated streams of air, or as a vacuum cleaner.

While this invention has been shown in but one form, it is obvious to those skilled in the art that it is not so limited but is susceptible of various changes and modifications without departing from the spirit and scope of the claimed invention.

I claim as my invention:

1. In a combined blower and suction device, an electric motor, a blower supported and operated by said motor, said blower having an axial air inlet and tangential air outlet, a hollow U-shaped handle having the ends of its legs secured to said motor, one of said legs being provided with a removable cover enclosing the front end of the handle adjacent the blower outlet, and a switch mounted on said cover for enclosure within said handle and interposed in a circuit leading from a source of current to said motor.

2. In a combined blower and suction device, an electric motor, a blower supported and operated by said motor, said blower having an axial air inlet and tangential air outlet, a hollow U-shaped handle having the ends of its legs secured to said motor, one of said legs being provided with a removable cover enclosing the front end of the handle adjacent the blower outlet, a switch mounted on said cover for enclosure within said handle and interposed in a circuit leading from a source of current to said motor, and a socket outlet connector mounted on said cover for enclosure within said handle and interposed in the circuit to said motor.

3. In a combined blower and suction device, an electric motor, a blower supported and operated by said motor, said blower having an axial air inlet and tangential air outlet, a hollow U-shaped handle having the ends of its legs secured to said motor, one of said legs being provided with a removable cover enclosing the front end of the handle adjacent the blower outlet, a switch mounted on said cover for enclosure within said handle and interposed in a circuit leading from a source of current to said motor, a socket outlet connector mounted on said cover for enclosure within said handle and interposed in the circuit to said motor, an air nozzle detachably connected to the blower outlet, an electrical heating unit mounted within said air nozzle, and a plug connector electrically connected to said heating unit for insertion into said socket outlet connector.

4. In a combined blower and suction device, an electric motor, a blower supported and operated by said motor, said blower having an axial air inlet and tangential air outlet, a hollow U-shaped handle having the ends of its legs secured to said motor, one of said legs being provided with a removable cover enclosing the front end of the handle adjacent the blower outlet, a switch mounted on said cover for enclosure within said handle and interposed in a circuit leading from a source of current to said motor, a socket outlet connector mounted on said cover for enclosure within said handle and interposed in the circuit to said motor, an air nozzle detachably connected to the blower outlet, a U-shaped supporting bracket mounted within said air nozzle, an electrical heating unit mounted on said U-shaped supporting bracket within said air nozzle, a plug connector electrically connected to said heating unit for insertion into said socket outlet connector, said switch being disposed in the electrical circuit for controlling the flow of current to said socket outlet connector.

5. In a combined blower and suction device, an electric motor, a blower supported and operated by said motor, said blower having an axial air inlet and tangential air outlet, a hollow U-shaped handle having the ends of its legs secured to said motor, one of said legs being provided with a removable cover enclosing the front end of the handle adjacent the blower outlet, a 3-way switch mounted on said cover for enclosure within said handle and interposed in a circuit leading from a source of current to said motor, a socket outlet connector mounted on said cover for enclosure within said handle and interposed in the circuit to said motor, an air nozzle detachably connected to the blower outlet, an electrical heating unit mounted within said air nozzle, and a plug connector electrically connected to said heating unit for insertion into said socket outlet connector.

6. In a combined blower and suction device, an electric motor, a blower connected to and operated by said motor, said blower having an axial air inlet and tangential air outlet, a hollow U-shaped handle having the ends of its legs secured to said motor, a switch mounted on the front leg of said handle for connection in an electrical circuit leading from a source of current to said motor, a socket outlet connector mounted on the front leg of said handle for connection in the electrical circuit leading from a source of current to said motor, an air nozzle detachably connected to said blower outlet, an electrical heating unit provided within said air nozzle, and a plug connector electrically connected to said heating unit and adapted to be electrically connected to said socket outlet connector.

7. In a combined blower and suction device, an electric motor, a blower connected to and operated by said motor, said blower having an axial air inlet and tangential air outlet, a hollow handle angularly offset at its front end to engage said motor, a primary electrical circuit leading from said motor through said hollow handle for connection to a source of current, a switch mounted within the front end of said handle and interposed in said primary electrical circuit, a socket outlet connector mounted on the front end of said handle and interposed in said primary electrical circuit, an air nozzle detachably connected to said blower outlet, an electrical heating unit provided within said air nozzle, a secondary electrical circuit leading from said heating unit, and a plug connector interposed in said secondary electrical circuit and detachably connected to said socket outlet to electrically connect said primary circuit to said secondary circuit.

GRANT W. BREUER.

REFERENCES CITED

The following references are of record in the file of this patent:

UNITED STATES PATENTS

| Number | Name | Date |
| --- | --- | --- |
| 1,646,365 | Willis | Oct. 18, 1927 |
| 1,703,551 | Singer | Feb. 26, 1929 |
| 1,777,744 | Breuer | Oct. 7, 1930 |
| 1,781,542 | Engberg et al. | Nov. 11, 1930 |
| 1,821,525 | Nielsen | Sept. 1, 1931 |
| 1,869,737 | Breuer | Aug. 2, 1932 |
| 2,031,391 | Spielman | Feb. 18, 1936 |